Jan. 10, 1956    R. B. FARIS, JR., ET AL    2,729,970
CARBONIZATION TESTING APPARATUS
Filed Oct. 28, 1952

INVENTORS
ROBERT B. FARIS JR. AND
JOHN D. BARTLESON
BY Oberlin & Limbach
ATTORNEYS.

United States Patent Office 2,729,970
Patented Jan. 10, 1956

2,729,970

CARBONIZATION TESTING APPARATUS

Robert B. Faris, Jr., Solon, and John D. Bartleson, Beechwood, Ohio, assignors to The Standard Oil Company, Cleveland, Ohio, a corporation of Ohio Application October 28, 1952, Serial No. 317,252

1 Claim. (Cl. 73—64)

In preparing lubricating oils for instance, it is desirable to know the effect of various blends of stocks as regards their resultant tendencies to production of carbon in engine usage. Also, it is desirable to ascertain with precision the effect of addition of various agents such as for modifying the properties of the oil. Also, in general it is desirable to be able to quickly and accurately, in reproducible manner, ascertain the carbon-deposit properties of oils of wide range, whether for lubrication, combustion or other usages. In the present invention, an accurately operating apparatus is provided, which can quickly give information as to carbonizing qualities at various controllable temperatures, etc. Other objects and advantages of the invention will be apparent from the following description.

To the accomplishment of the foregoing and related ends, said invention then comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

Figure 3:
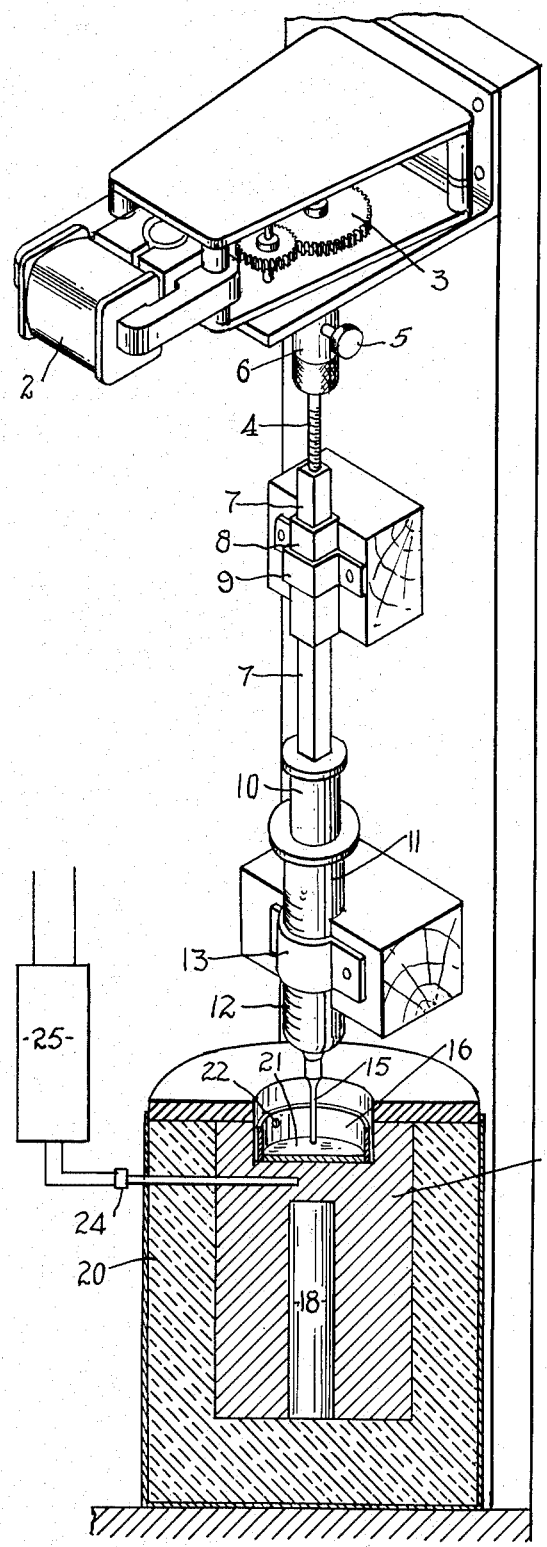
Fig. 3 is a side elevational view of forceps for handling such dish.
Figure 3:
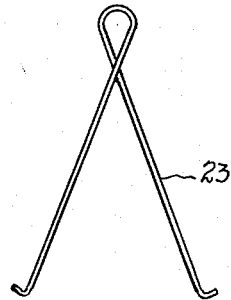
Figure 2:
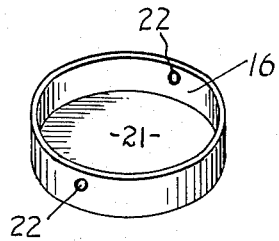
Fig. 2 is a plan view of the testing dish.
Figure 1:
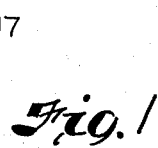
Fig. 1 is a perspective view, with the lower portion sectioned, showing an embodiment of the invention.

In general, the apparatus involves a precision fine rate feed means for the liquid to be tested, such feed means being by precision drive, and the fed liquid is supplied to a metal surface heated with accurate control to desired temperature.

The apparatus, in the illustrative embodiment shown, involves an electric motor 2 with a gear train 3, speed reduction rotating a screw threaded shaft 4, which is detachably connected by a thumb screw 5 to the main drive-stub 6. The screw threaded shaft 4 takes into the threaded bore of a squared shaft or stem 7 which is axially reciprocable in a guide 8 held by holding means 9. The lower end of the squared shaft 7 carries a piston 10 which is reciprocable in a cylinder 11 having graduations 12, the cylinder being of glass and mounted by a holding means 13. A peculiarity of the cylinder arrangement is that its outlet is by a very fine nozzle 15, something on the order of the type of a hypodermic needle. To receive the discharge from the nozzle 15, a dish 16 is arranged therebelow, being seatable in a recess in a heat-conducting block 17. Desirably, this may be of aluminum, and in a suitable bore or bores contains electric heating cartridge means 18 whereby the desired temperature of the block 17 and the dish 16 is attained. Surrounding the heating block 17 is a body of suitable insulation 20.

With a reversible drive motor, the piston 10 may be withdrawn from the cylinder for recharging as desired. The thumb screw 5 as connecting means also facilitates change in the stem drive.

A peculiarity of the testing dish 16 is that its bottom 21 is of carbon steel, while its cylindrical side wall is of stainless steel. In the side wall diametrally positioned poles 22 permit convenient manipulation in removing and replacing the dish, by spring-spreading forceps 23.

A pyrometer 24 connected to current control and indicating means 25 provides indication of the temperature of the heating block at the base of the test dish. While the actual temperature of the bottom of the dish can be taken by a thermocouple set in the dish for the purpose, it is more advantageous to initially use such a dish thermo-couple for comparing with the reading obtained by the thermo-couple 24 in the heating block, and calibrating this by the temporarily used thermo-couple in the dish. Thenceforth, any and all readings are conveneintly made by reference to the indications from thermo-couple 24.

As an example: The effect of blending this stock may thus be ascertained, and with a blend of 7½ per cent bright stock of 250 S. U. S. @ 210 and 92.5 per cent neutral stock 140 @ 100, for instance, at a temperature of 500° F., while the motor drive feeds the oil at the rate of 0.42 cc. per minute, 69 per cent residue occurs. Again, similarly, with a blend of 49 per cent of 350 steam-refined stock and 51 per cent of 140 neutral stock, at a temperature of 650° F., a residue of 65 per cent occurs, while at a temperature of 850° F., there is a 25 per cent residue. A less volatile oil containing a high percentage of steam-refined stock shows nearly a straight line curve from 500° F., to 900° F., and considerable residue, even at temperatures above 900° F. An oil containing lower concentration of residual oil gave highly carbon at temperatures 500 to 600° F., but fell off sharply in carbon deposit above 600° F. This illustrates the wide variation in residues, depending upon oil composition.

Quality control for the blending of lubricating oils can be carried out expeditiously and with precision. The effect of various additives can easily be determined also. And as the temperature can be controlled to any desired point and through a range covering conditions for oils generally, the behavior of a particular oil can be followed through an entire range of operating temperatures.

Other modes of applying the principle of the invention may be employed, change being made as regards the details described, provided the features stated in the following claim or the equivalent of such be employed.

We therefore particularly point out and distinctly claim as our invention:

In oil-carbonization testing apparatus, a body of heat insulating material, a metal block of considerable mass received within an opening provided therefor in such insulating material, a portion of the upper surface of the block as thus received being exposed and so formed as to provide a cylindrical recess in the block at such region, a metal receiver of dished cylindrical form removably positioned in the block recess with its bottom resting on the bottom of the recess, the outside diameter and height of said receiver being slightly less than the respectively corresponding dimensions of the recess, a cylinder made of transparent material having capacity indicia thereon and a projecting fine nozzle at one end, a support mounting said cylinder vertically above the receiver with its nozzle directed downwardly toward the latter, whereby oil to be tested may be discharged from the cylinder to the receiver, a piston in said cylinder, a stem attached to and projecting upwardly from the piston beyond the upper end of the cylinder, guide structure so constructed and engaged with said stem as to prevent rotation of the same, a shaft threadably engaged with the stem for controlled axial advance and retraction thereof and hence of the piston, a reversible electric motor connected to and operative to drive said shaft, electric heating means in the body of the metal block spaced therewithin from the walls of such recess, said heating means being operative to effect carbonization of a measured quantity of the oil placed in the receiver by means of the piston-cylinder feed assembly through the conduction of heat from the block to the receiver, and means for measuring the temperature of the block approximately at the base of the recess within which the receiver is disposed.

References Cited in the file of this patent

UNITED STATES PATENTS

| | | |
|---|---|---|
| 2,174,021 | Thwaites | Sept. 26, 1939 |
| 2,296,164 | Humphrey | Sept. 15, 1942 |
| 2,650,256 | Lingane | Aug. 25, 1953 |

FOREIGN PATENTS

| | | |
|---|---|---|
| 817,166 | France | May 15, 1937 |

OTHER REFERENCES

Analytical Chemistry, vol. 20, 1948, p. 286.